US012624292B2

(12) United States Patent
Hayashi et al.

(10) Patent No.: US 12,624,292 B2
(45) **Date of Patent: *May 12, 2026**

(54) CHOLESTERIC LIQUID CRYSTAL FILM AND MANUFACTURING METHOD THEREOF

(71) Applicant: FUJIFILM Corporation, Tokyo (JP)

(72) Inventors: Takahiro Hayashi, Kanagawa (JP); Satoshi Kuniyasu, Kanagawa (JP); Mitsuyoshi Ichihashi, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/874,489

(22) Filed: Jul. 27, 2022

(65) Prior Publication Data

US 2022/0372372 A1 Nov. 24, 2022

Related U.S. Application Data

(63) Continuation of application No. PCT/JP2020/047688, filed on Dec. 21, 2020.

(30) Foreign Application Priority Data

Jan. 31, 2020 (JP) ................................ 2020-015748

(51) Int. Cl.

| | |
|---|---|
| ***G02F 1/1333*** | (2006.01) |
| ***C09K 19/20*** | (2006.01) |
| ***C09K 19/30*** | (2006.01) |
| ***C09K 19/36*** | (2006.01) |

(52) U.S. Cl.

CPC .......... *C09K 19/36* (2013.01); *C09K 19/2007* (2013.01); *C09K 19/3068* (2013.01); *C09K 2019/2078* (2013.01); *C09K 2019/3075* (2013.01); *C09K 2019/3077* (2013.01); *C09K 2219/03* (2013.01)

(58) Field of Classification Search

CPC ................ C09K 19/36; C09K 19/2007; C09K 19/3068; C09K 19/3491; C09K 19/586; C09K 2019/2078; C09K 2019/3075; C09K 2019/3077; C09K 2019/0448

See application file for complete search history.

(56) References Cited

U.S. PATENT DOCUMENTS

| | | | | |
|---|---|---|---|---|
| 6,410,130 | B1 | 6/2002 | Schuhmacher et al. | |
| 6,537,624 | B1 | 3/2003 | Suzuki et al. | |
| 6,605,235 | B1 | 8/2003 | Meyer et al. | |
| 6,627,270 | B1 | 9/2003 | Nishimura | |
| 10,459,132 | B2 * | 10/2019 | Yamamoto | G02B 5/0226 |
| 11,209,688 | B2 * | 12/2021 | Katoh | G02B 5/30 |
| 11,732,194 | B2 * | 8/2023 | Kodama | C09K 19/586 356/369 |
| 11,828,960 | B2 | 11/2023 | Sasata et al. | |
| 11,919,327 | B2 | 3/2024 | Kaneiwa | |
| 11,977,306 | B2 | 5/2024 | Hayashi et al. | |
| 2002/0045676 | A1 | 4/2002 | Coates et al. | |
| 2002/0159019 | A1 | 10/2002 | Pokorny et al. | |
| 2003/0086044 | A1 | 5/2003 | Inque et al. | |
| 2003/0090618 | A1 | 5/2003 | Kashima | |
| 2006/0152656 | A1 | 7/2006 | Kashima et al. | |
| 2007/0258024 | A1 | 11/2007 | Parri et al. | |
| 2010/0182545 | A1 | 7/2010 | Kashima et al. | |
| 2017/0227692 | A1 | 8/2017 | Nagai et al. | |
| 2017/0343830 | A1 | 11/2017 | Nagai et al. | |
| 2018/0164480 | A1 | 6/2018 | Yoshida | |
| 2019/0033634 | A1 | 1/2019 | Katoh et al. | |
| 2019/0196245 | A1 | 6/2019 | Ichihara et al. | |
| 2019/0391479 | A1 | 12/2019 | Katoh et al. | |
| 2020/0183214 | A1 | 6/2020 | Katoh | |
| 2020/0409202 | A1 | 12/2020 | Kodama et al. | |
| 2021/0026049 | A1 | 1/2021 | Saitoh et al. | |
| 2021/0116615 | A1 | 4/2021 | Kodama et al. | |
| 2021/0208316 | A1 | 7/2021 | Sato et al. | |
| 2022/0333013 | A1 * | 10/2022 | Hayashi et al. | C09K 19/36 |
| 2022/0372372 | A1 * | 11/2022 | Hayashi | C09K 19/586 |
| 2022/0373726 | A1 * | 11/2022 | Hayashi et al. | G02B 5/1852 |

FOREIGN PATENT DOCUMENTS

| | | | |
|---|---|---|---|
| CN | 1527956 | A | 9/2004 |
| CN | 1573458 | A | 2/2005 |
| CN | 1823284 | A | 8/2006 |
| CN | 107111029 | A | 8/2017 |

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/047688, dated Aug. 11, 2022, with an English translation.

International Search Report (Form PCT/ISA/210) for International Application No. PCT/JP2020/047688, dated Feb. 16, 2021, with an English translation.

Chinese Office Action and Search Report for corresponding Chinese Application No. 202080095223.4, dated Aug. 5, 2023, with a partial English translation.

Japanese Decision of Refusal for corresponding Japanese Application No. 2021-574539, dated Oct. 24, 2023, with an English translation.

Japanese Notice of Reasons for Refusal for Japanese Application No. 2021-574540, dated Oct. 24, 2023, with an English translation.

Chinese Office Action and Search Report for Chinese Application No. 202080091366.8, dated Jul. 12, 2023, with a partial English translation,.

(Continued)

*Primary Examiner* — Geraldina Visconti

(74) *Attorney, Agent, or Firm* — Birch, Stewart, Kolasch & Birch, LLP

(57) ABSTRACT

Provided are a cholesteric liquid crystal film including a cholesteric liquid crystal, in which, in a cross section in a thickness direction observed with a microscope, the cholesteric liquid crystal film has a stripe pattern in which dark portions and bright portions are alternately arranged, and has a folded structure due to the dark portions at a surface layer portion of one main surface of a pair of main surfaces; and a manufacturing method thereof.

6 Claims, 3 Drawing Sheets

(56) References Cited

FOREIGN PATENT DOCUMENTS

| | | | | | |
|---|---|---|---|---|---|
| CN | 107250910 | A | | 10/2017 | |
| CN | 108885293 | A | | 11/2018 | |
| CN | 109716181 | A | | 5/2019 | |
| EP | 1 045 260 | A1 | | 10/2000 | |
| JP | 2000-95883 | A | | 4/2000 | |
| JP | 2001-172329 | A | | 6/2001 | |
| JP | 2001-515094 | A | | 9/2001 | |
| JP | 2002-189124 | A | | 7/2002 | |
| JP | 2005-37735 | A | | 2/2005 | |
| JP | 2005-49866 | A | | 2/2005 | |
| JP | 2007-94625 | A | | 4/2007 | |
| JP | 2008-505369 | A | | 2/2008 | |
| JP | 2013-120350 | A | | 6/2013 | |
| JP | 2013-233733 | A | | 11/2013 | |
| JP | 2018-180122 | A | | 11/2018 | |
| KR | 10-2019-0026916 | A | | 3/2019 | |
| WO | WO 99/34242 | A1 | | 7/1999 | |
| WO | WO 2016/194961 | A1 | | 12/2016 | |
| WO | WO 2017/221806 | A1 | * | 12/2017 | ............... G02B 5/30 |
| WO | WO 2018/043678 | A1 | | 3/2018 | |
| WO | WO 2018/159751 | A1 | | 9/2018 | |
| WO | WO 2019/035449 | A1 | | 2/2019 | |
| WO | WO 2019/181247 | A1 | | 9/2019 | |
| WO | WO 2019/182052 | A1 | | 9/2019 | |
| WO | WO 2019/187951 | A1 | | 10/2019 | |
| WO | WO 2019/189586 | A1 | | 10/2019 | |
| WO | WO 2020/066429 | A1 | | 4/2020 | |
| WO | WO 2020/196659 | A1 | | 10/2020 | |

OTHER PUBLICATIONS

Chinese Office Action and Search Report for Chinese Application No. 202080095000.8, dated Sep. 16, 2023, with an English translation.
International Preliminary Report on Patentability and Written Opinion of the International Searching Authority (Forms PCT/IB/326, PCT/IB/373, and PCT/ISA/237) for International Application No. PCT/JP2020/043477, dated Aug. 11, 2022, with an English translation.
International Preliminary Report on Patentability and Written Opinion of the International Searching Authority (Forms PCT/IB/326, PCT/IB/373, and PCT/ISA/237) for International Application No. PCT/JP2020/047689, dated Aug. 11, 2022, with an English translation.
International Search Report (Form PCT/ISA/210) for International Application No. PCT/JP2020/043477, dated Feb. 9, 2021, with an English translation.
International Search Report (Form PCT/ISA/210) for International Application No. PCT/JP2020/047689, dated Feb. 16, 2021, with an English translation.
Japanese Notice of Reasons for Refusal for Japanese Application No. 2021-574482, dated Feb. 14, 2023, with an English translation.
Japanese Notice of Reasons for Refusal for Japanese Application No. 2021-574540, dated May 30, 2023, with an English translation.
U.S. Office Action for U.S. Appl. No. 17/876,315, dated Dec. 8, 2023.
U.S. Office Action for U.S. Appl. No. 17/876,315, dated Mar. 22, 2024.
Chinese Office Action for corresponding Chinese Application No. 202080095223.4, dated Jan. 25, 2024, with an English translation.
U.S. Office Action for U.S. Appl. No. 17/858,561, dated Feb. 7, 2024.
Korean Office Action for Korean Application No. 10-2022-7021871, dated Jun. 19, 2024, with an English translation.
Chinese Office Action and Search Report for corresponding Chinese Application No. 202080095000.8, dated Jun. 8, 2024, with an English translation.
U.S. Office Action for U.S. Appl. No. 17/858,561, dated Jul. 29, 2024.
South Korean Office Action for South Korean Application No. 10-2022-7026360, dated Oct. 7, 2024, with an English translation.
U.S. Advisory Action for U.S. Appl. No. 17/858,561, dated Oct. 9, 2024.
Japanese Office Action for corresponding Japanese Application No. 2021-574539, dated Apr. 2, 2024, with an English translation.
Korean Office Action for corresponding Korean Application No. 10-2022-7025941, dated Jun. 25, 2024, with an English translation.
Japanese Office Action for Japanese Application No. 2021-574540, dated Mar. 26, 2024, with an English translation.
Japanese Office Action for Japanese Application No. 2021-574540, dated Jul. 23, 2024, with an English translation.
U.S. Office Action for U.S. Appl. No. 17/876,315, dated Sep. 28, 2024.
U.S. Office Action for U.S. Appl. No. 17/858,561, dated Mar. 12, 2025.
U.S. Office Action for U.S. Appl. No. 17/876,315, dated Jan. 6, 2025.
Korean Office Action for Korean Application No. 10-2022-7026360, dated May 16, 2025, with English translation.
U.S. Office Action for U.S. Appl. No. 17/876,315, dated Jul. 2, 2025.
Japanese Office Action dated May 30, 2023 for corresponding Application No. 2021-574539 with an English translation.
U.S. Appl. No. 17/858,561, filed Jul. 6, 2022.
U.S. Appl. No. 17/876,315, filed Jul. 28, 2022.

* cited by examiner

CHOLESTERIC LIQUID CRYSTAL FILM AND MANUFACTURING METHOD THEREOF

CROSS-REFERENCE TO RELATED APPLICATIONS

This application is a continuation application of International Application No. PCT/JP2020/047688, filed Dec. 21, 2020, the disclosure of which is incorporated herein by reference in its entirety. Further, this application claims priority from Japanese Patent Application No. 2020-015748, filed Jan. 31, 2020, the disclosure of which is incorporated herein by reference in its entirety.

BACKGROUND OF THE INVENTION

1. Field of the Invention

The present disclosure relates to a cholesteric liquid crystal film and a manufacturing method thereof.

2. Description of the Related Art

By microscopic observation, it is known that a cholesteric liquid crystal film has a stripe pattern consisting of dark portions and bright portions.

For example, FIG. 6 of WO2018/043678A shows an image of a cross section of the cholesteric liquid crystal film by SEM, and the stripe pattern consisting of the dark portions and the bright portions is confirmed.

For example, FIG. 5 of JP2005-37735A shows an image of a cross-sectional structure captured by a transmission electron microscope of a cholesteric liquid crystal polarization selective reflective layer, and the stripe pattern consisting of the dark portions and the bright portions is confirmed.

SUMMARY OF THE INVENTION

The stripe pattern consisting of the dark portions and the bright portions in the cholesteric liquid crystal film indicates an arrangement state of a cholesteric liquid crystal.

In a case where an alignment state of the cholesteric liquid crystal differs between a front surface side and a back surface side even though the cholesteric liquid crystal film is a single layer, it is expected that an application of the cholesteric liquid crystal film will be widened.

Therefore, the present disclosure has been made in view of the above-described circumstances.

An object of an embodiment of the present disclosure is to provide a cholesteric liquid crystal film in which an alignment state of a cholesteric liquid crystal differs between a front surface side and a back surface side and a manufacturing method thereof.

The specific methods for achieving the objects include the following aspects.

<1>A cholesteric liquid crystal film comprising:

a cholesteric liquid crystal, in which, in a cross section in a thickness direction observed with a microscope, the cholesteric liquid crystal film has a stripe pattern in which dark portions and bright portions are alternately arranged, and has a folded structure due to the dark portions at a surface layer portion of one main surface of a pair of main surfaces.

<2> The cholesteric liquid crystal film according to <1>, in which, in the cross section, the dark portions in the stripe pattern is inclined with respect to the main surface.

<3> The cholesteric liquid crystal film according to <2>, in which an inclined angle of the dark portions in the stripe pattern with respect to the main surface is 20° to 90°.

<4> The cholesteric liquid crystal film according to any one of <1> to <3>, in which the folded structure due to the dark portions exists in a region from the one main surface to ⅓ of a film thickness.

<5> The cholesteric liquid crystal film according to any one of <1> to <4>, in which, in the surface layer portion of the one main surface, the folded structure due to the dark portions exists at 2 to 10 places in 20 dark portions adjacent to each other.

<6> The cholesteric liquid crystal film according to any one of <1> to <5>, in which, in a surface layer portion of the other main surface of the pair of main surfaces, the folded structure due to the dark portions does not exist in 20 dark portions adjacent to each other, or exists in less than 2 places in 20 dark portions adjacent to each other.

<7>A manufacturing method of a cholesteric liquid crystal film, comprising:

a first step of applying a coating liquid including a solvent, a liquid crystal compound, and a chiral agent onto a substrate to form a coating film; and a second step of applying a shearing force to a surface of the formed coating film with a blade, in which a shear rate in the second step is 1000 seconds$^{-1}$ or more.

According to the embodiment of the present disclosure, a cholesteric liquid crystal film in which an alignment state of a cholesteric liquid crystal differs between a front surface side and a back surface side and a manufacturing method thereof are provided.

DESCRIPTION OF THE PREFERRED EMBODIMENTS

Figure 1:
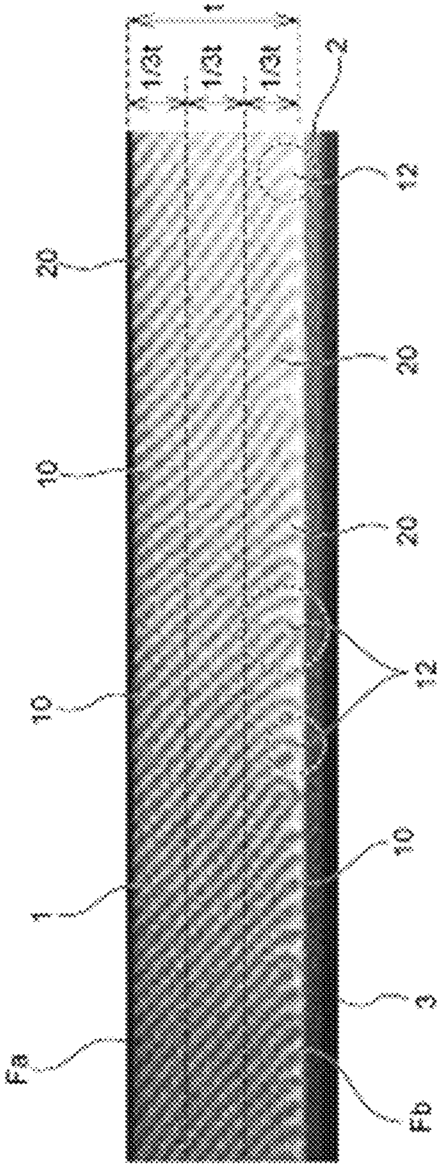
FIG. 1 is an example of a microscopic observation image of a cross section of a cholesteric liquid crystal film according to an embodiment of the present disclosure in a thickness direction.

Hereinafter, embodiments of the present disclosure will be described in detail. The present disclosure is not limited in any way to the following embodiments, and may be implemented with appropriate modifications within the scope of the purpose of the present disclosure.

In a case where the embodiments of the present disclosure are described with reference to the drawings, the description of overlapping constituent elements and reference numerals may be omitted in the drawings. The constituent elements indicated by the same reference numeral in the drawings mean the same constituent element. A dimensional ratio in the drawing does not necessarily represent the actual dimensional ratio.

The numerical range indicated by using "to" in the present disclosure indicates a range including numerical values described before and after "to" as a lower limit value and an upper limit value, respectively. Regarding numerical ranges which are described stepwise in the present disclosure, an upper limit value or a lower limit value described in a numerical value may be replaced with an upper limit value or a lower limit value of another stepwise numerical range. In addition, regarding a numerical range described in the present disclosure, an upper limit value or a lower limit value described in a numerical value may be replaced with a value described in Examples.

In the present disclosure, the amount of each component in a coating liquid means, in a case where the coating liquid contains a plurality of substances corresponding to such a component, the total amount of the plurality of substances in the coating liquid, unless otherwise specified.

In the present disclosure, a term "step" not only includes an independent step, but also includes a step, in a case where the step may not be distinguished from the other step, as long as the expected object of the step is achieved.

In the present disclosure, a combination of two or more preferred aspects is a more preferred aspect.

In the present disclosure, a "main surface" means a surface having a main area on a surface of an object, and a term "pair of main surfaces" corresponds to a front surface and a back surface of a film-like material such as the cholesteric liquid crystal film.

From the viewpoint of manufacturing, the "pair of main surfaces" are preferably arranged parallel to each other. Here, the "parallel to each other" means that an angle formed by one main surface and the other main surface is less than ±5°.

In the present disclosure, a "molecular axis" means an axis which passes through a center of a molecular structure along a longitudinal direction of the molecular structure. However, a "molecular axis" used for a disk-like liquid crystal compound means an axis which intersects a disc plane of the disk-like liquid crystal compound at a right angle.

In the present disclosure, a "solid content" means components obtained by excluding a solvent from all components of an object.

In the present disclosure, a "mass of solid content" means a mass obtained by substracting a mass of the solvent from a mass of the object.

<Cholesteric Liquid Crystal Film>

A cholesteric liquid crystal film according to an embodiment of the present disclosure is a cholesteric liquid crystal film comprising a cholesteric liquid crystal, in which, in a cross section in a thickness direction observed with a microscope, the cholesteric liquid crystal film has a stripe pattern in which dark portions and bright portions are alternately arranged, and has a folded structure due to the dark portions at a surface layer portion of one main surface of a pair of main surfaces.

That is, by observing the cross section of the cholesteric liquid crystal film according to the embodiment of the present disclosure in the thickness direction with a microscope, a stripe pattern in which dark portions and bright portions are alternately arranged, and a folded structure due to the dark portions at a surface layer portion of one main surface of a pair of main surfaces are seen.

Here, the "cross section in the thickness direction" is a cross section obtained in a case where the cholesteric liquid crystal film is cut along the thickness direction.

As described above, since the cross section in the thickness direction observed with a microscope has the stripe pattern and the folded structure at the surface layer portion of one main surface of a pair of main surfaces, it can be said that the cholesteric liquid crystal film according to the embodiment of the present disclosure is a cholesteric liquid crystal film in which an alignment state of a cholesteric liquid crystal differs between a front surface side and a back surface side.

In this way, since the folded structure due to the dark portions is seen in the surface layer portion of one main surface, it is presumed that, for example, a light scattering performance and the like differ between the one main surface side where the folded structure is seen and the other main surface side.

As a result, it is considered that the cholesteric liquid crystal film according to the embodiment of the present disclosure can be applied to applications using the difference in light scattering performance between the front surface side and the back surface side. For example, in a case where the folded structure due to the dark portions is seen on the surface layer portion of one main surface, a function of scattering light only in a specific direction may be exhibited on the one main surface side. The cholesteric liquid crystal film having such a function can be applied to a transparent screen, lighting, an electronic signage, or the like.

In the cross section captured by a microscope, which is disclosed in WO2018/043678A and JP2005-37735A described above, although the stripe pattern in which the dark portions and the bright portions are alternately arranged is observed, the folded structure due to the dark portions exists in the central portion in the thickness direction, which does not have the configuration of the cholesteric liquid crystal film according to the embodiment of the present disclosure.

[Cholesteric Liquid Crystal]

The cholesteric liquid crystal film according to the embodiment of the present disclosure includes a cholesteric liquid crystal.

The cholesteric liquid crystal has a laminated structure in which layers composed of molecular groups of liquid crystal compounds are stacked. In each layer, the molecules of each liquid crystal compound are arranged in a certain direction (that is, molecular axes are arranged in a certain direction), and a helical structure is formed by shifting an arrangement direction of the molecules of each layer so as to revolve in a helical shape as the molecules progress in a lamination direction.

The axis of this helical structure is called a helical axis of the cholesteric liquid crystal.

[Microscopic Observation of Cross Section in Thickness Direction]

As described above, the cholesteric liquid crystal film according to the embodiment of the present disclosure has the stripe pattern and the folded structure in the cross section in the thickness direction observed with a microscope.

A scanning electron microscope (also referred to as SEM) or a polarization microscope is used for the microscopic observation. In the microscopic observation, a scanning electron microscope (SEM) and a polarization microscope may be used properly depending on a magnitude of a pitch of the stripe pattern (that is, a distance between the dark portions or a distance between the bright portions).

In order to obtain the cross section in the thickness direction, for example, the cholesteric liquid crystal film may be cut with a microtome.

In addition, the cross section in the thickness direction may be observed at 18 points (that is, 180°) by rotating the cutting surface in increments of 10°. It is sufficient that the stripe pattern and a folded structure are seen in at least one of the 18 points.

Here, an area of the cross section to be observed is, for example, at least 1000 $\mu m^2$.

In addition, in the above-described microscopic observation in the present disclosure, at least 10 (preferably, at least 20) dark portions and bright portions alternately arranged are regarded as the "stripe pattern".

(Stripe Pattern)

The cholesteric liquid crystal film according to the embodiment of the present disclosure has a stripe pattern in which the dark portions and the bright portions are alternately arranged in a cross section in a thickness direction observed with a microscope.

The stripe pattern will be described with reference to FIG. 1. Here, FIG. 1 is an example of a microscopic observation image of the cross section of the cholesteric liquid crystal film according to the embodiment of the present disclosure in the thickness direction.

FIG. 1 is a microscopic observation image of a laminate provided with a cholesteric liquid crystal film 1 according to the embodiment of the present disclosure on an alignment layer of a substrate 3 having an alignment layer 2, and the cholesteric liquid crystal film 1 has a stripe pattern in which the dark portions 10 and the bright portions 20 are alternately arranged.

In the cholesteric liquid crystal film 1 shown in FIG. 1, the dark portions 10 are arranged at equal intervals, and the bright portions 20 are also arranged at equal intervals.

The dark portions and the bright portions seen by the microscopic observation appear because an orientation of a molecular axis of a liquid crystal compound forming a helical structure changes with respect to the cross section observed with a microscope.

For example, in a case of observing a cholesteric liquid crystal film including a rod-like liquid crystal compound with a polarization microscope, a region where the orientation of the molecular axis of the rod-like liquid crystal compound is orthogonal to the cross section observed with a microscope (including a state close to orthogonal to the cross section observed with a microscope; the same applies hereinafter), and the region looks relatively bright.

On the other hand, in a case of observing the cholesteric liquid crystal film including a rod-like liquid crystal compound with a polarization microscope, a region where the orientation of the molecular axis of the rod-like liquid crystal compound is parallel to the cross section observed with a microscope (including a state close to parallel to the cross section observed with a microscope; the same applies hereinafter), and the region looks relatively dark.

By alternately arranging the above-described two regions, the stripe pattern in which the bright portions and the dark portions are alternately arranged can be seen.

The molecular axis of the liquid crystal compound will be described in more detail.

Figure 2:
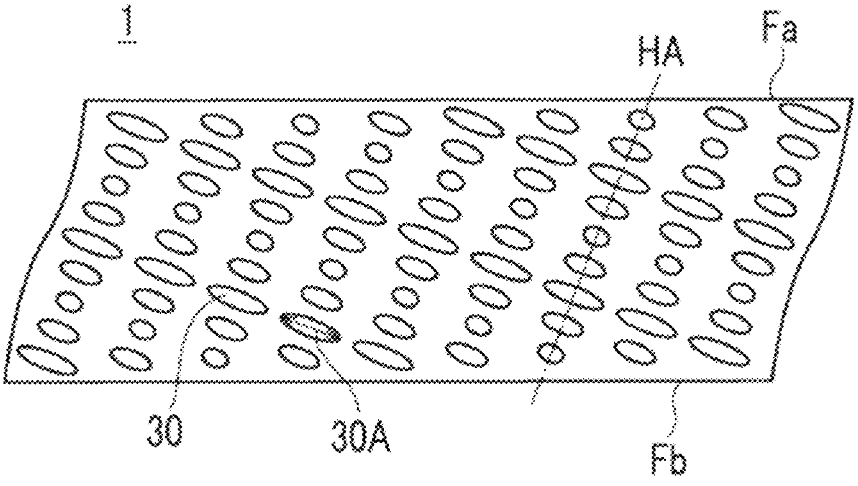
FIG. 2 is a schematic diagram showing an example of a molecular arrangement of a rod-like liquid crystal compound in the cross section of the cholesteric liquid crystal film.

In a case where the dark portions and the bright portions are seen in the microscopic observation of the cross section in the thickness direction, it is considered that molecules of the liquid crystal compound in the cholesteric liquid crystal film are arranged as shown in FIG. 2, for example. Here, FIG. 2 is a schematic diagram showing an example of a molecular arrangement of a rod-like liquid crystal compound in the cross section of the cholesteric liquid crystal film.

The cholesteric liquid crystal film 1 shown in FIG. 2 has a pair of main surfaces (that is, main surfaces Fa and Fb) and includes rod-like liquid crystal compounds 30 shown by an ellipse. The rod-like liquid crystal compounds 30 are in a form of the cholesteric liquid crystal and are arranged helically along a helical axis HA.

That is, since the rod-like liquid crystal compounds 30 in the cholesteric liquid crystal film 1 are arranged in a helical shape, the orientation of the molecular axis 30A with respect to the cross section observed with a microscope changes along the helical axis. In FIG. 2, a state in which the molecular axis 30A is orthogonal to the cross section observed with the microscope is shown by a shape in which a major axis of the ellipse showing the rod-like liquid crystal compound 30 is short, and a state in which the molecular axis 30A is parallel to the cross section observed with a microscope is shown by a shape in which a major axis of the ellipse showing the rod-like liquid crystal compound 30 is long.

As shown in FIG. 2, by arranging the molecules of the rod-like liquid crystal compound 30, a region where the orientation of the molecular axis 30A of the rod-like liquid crystal compound 30 is parallel to the cross section observed with a microscope (that is, a region where the major axis of the ellipse showing the rod-like liquid crystal compound 30 is shown as a long shape) is observed as the dark portions. For the same reason, a region where the orientation of the molecular axis 30A of the rod-like liquid crystal compound 30 is orthogonal to the cross section observed with a microscope (that is, a region where the major axis of the ellipse showing the rod-like liquid crystal compound 30 is shown as a short shape) is observed as the bright portions.

In the cholesteric liquid crystal film 1 shown in FIG. 2, the helical axis HA is orthogonal to the molecular axis 30A of the rod-like liquid crystal compound 30, and is inclined with respect to the main surfaces Fa and Fb of the cholesteric liquid crystal film 1.

Since the helical axis HA is inclined in this way, the dark portions in the stripe pattern is inclined with respect to the main surface, as will be described later.

An inclined angle of the helical axis HA with respect to the main surfaces Fa and Fb is orthogonal to an inclined angle of the dark portions with respect to the main surface in the stripe pattern.

The dark portions in the stripe pattern is preferably inclined with respect to the main surface.

That is, as shown in FIG. 1, it is preferable that the dark portions 10 in the stripe pattern is inclined with respect to the main surfaces Fa and Fb. Since the dark portions are inclined, the stripe pattern itself is also inclined, and a reflected light caused by the cholesteric liquid crystal can be strongly emitted in a direction inclined with respect to a vertical direction of the main surface.

In the present disclosure, the aspect that "the dark portions are inclined with respect to the main surface" means that the dark portions and the main surface are not parallel in the cross section in the thickness direction observed with a microscope.

More specifically, the inclined angle of the dark portions with respect to the main surface in the stripe pattern is preferably 20° to 90°, more preferably 30° to 90°, and still more preferably 40° to 90°.

The inclined angle of the dark portions with respect to the main surface is obtained by the following method.

In the microscopic observation of the cross section in the thickness direction, an angle θ formed by a straight line passing through the central portion in the width direction at both ends in the longitudinal direction of one dark portion and the main surface is measured. Here, the dark portions for measuring the angle θ is selected from dark portions which do not form the folded structure. In addition, unless the angle θ is 90°, a smaller angle (that is, an acute angle) at the intersection is defined as the inclined angle. This measurement is performed for 10 dark portions, and an arithmetic mean value of the obtained measured values for the 10 dark portions is defined as the inclined angle of the dark portions with respect to the main surface.

From the viewpoint of ease of forming the helical structure in the cholesteric liquid crystal, the distance between the dark portions in the stripe pattern is preferably 0.01 μm to 500 μm, more preferably 0.05 μm to 100 μm, and still more preferably 0.1 μm to 5 μm.

The distance between the dark portions is obtained by the following method.

In the microscopic observation of the cross section in the thickness direction, the shortest distance between 5 sets of adjacent dark portions is measured. More specifically, first, 6 dark portions adjacent to each other are selected, and 5 sets of adjacent dark portions are extracted from the 6 dark portions. Thereafter, as the shortest distance between adjacent dark portions, the shortest distance between the center of one dark portion in a width direction and the center of the other dark portions in the width direction in the sets is measured. This measurement is performed for 5 sets, and an arithmetic mean value of the measured values for the 5 sets is defined as the distance between dark portions.

The dark portions in the stripe pattern are preferably arranged at equal intervals.

Here, the "equal interval" does not have to be completely equal intervals, and it is sufficient that the value of the shortest distance between the adjacent dark portions measured in a case of obtaining the distance between the dark portions at 5 points is within ±10% of the distance between the dark portions (that is, the arithmetic mean value).

(Folded Structure)

The cholesteric liquid crystal film according to the embodiment of the present disclosure has a folded structure due to the dark portions at a surface layer portion of one main surface of a pair of main surfaces in the cross section in the thickness direction observed with a microscope.

The folded structure refers to a structure in which adjacent dark portions or near dark portions are bonded to each other. More specifically, as shown in FIG. 1, a folded structure 12 refers to a structure in which adjacent dark portions or near dark portions are bonded to each other to look like a U shape.

In the cholesteric liquid crystal film according to the embodiment of the present disclosure, the above-described folded structure can be seen in the surface layer portion of one main surface of the pair of main surfaces.

It is preferable that the dark portions forming the folded structure in the surface layer portion of one main surface of the pair of main surfaces does not form a folded structure in the surface layer portion of the other main surface.

Here, the surface layer portion refers to a region excluding the central portion of the cholesteric liquid crystal film in the thickness direction, and specifically, refers to a region from the main surface to ⅓ of a film thickness. That is, in the cholesteric liquid crystal film according to the embodiment of the present disclosure, the folded structure (that is, a U-shaped portion) exists in the region from one main surface of the pair of main surfaces of the cholesteric liquid crystal film to ⅓ of the film thickness.

More specifically with reference to FIG. 1, the folded structure (that is, the U-shaped portion) 12 exists in the region from the main surface Fb of the cholesteric liquid crystal film 1 to ⅓ of a film thickness t.

Although the folded structure varies depending on the film thickness of the cholesteric liquid crystal film, the folded structure may exist in a region from one main surface of the pair of main surfaces of the cholesteric liquid crystal film to ¼ of the film thickness, or may exist in a region from one main surface of the pair of main surfaces of the cholesteric liquid crystal film to ⅕ of the film thickness.

From the viewpoint that an optical performance obtained by the folded structure is easily exhibited, the folded structure due to the dark portions in the surface layer portion of one main surface preferably exists at 2 to 10 places in 20 dark portions adjacent to each other, more preferably exists at 3 to 10 places, and still more preferably exists at 5 to 10 places.

In the cholesteric liquid crystal film according to the embodiment of the present disclosure, the folded structure due to the dark portions in the surface layer portion of the other main surface (that is, a main surface opposite to one main surface having the folded structure on the surface layer portion) of the pair of main surfaces preferably does not exist in 20 dark portions adjacent to each other or exists in less than 2 places, and more preferably does not exist.

That is, in the cholesteric liquid crystal film according to the embodiment of the present disclosure, the folded structure as described above is not seen or is very rarely seen in the surface layer portion of the other main surface of the pair of main surfaces.

More specifically with reference to FIG. 1, it is preferable that the folded structure (that is, the U-shaped portion) 12 does not exist in the region from the main surface Fa of the cholesteric liquid crystal film 1 to ⅓ of a film thickness t.

The number of folded structures is obtained by the following method.

In the microscopic observation of the cross section in the thickness direction, 100 adjacent dark portions in the surface layer portion (that is, the region from the main surface to ⅓ of the film thickness) are extracted, and the number of folded structures in 20 dark portions is counted.

The dark portions to be extracted are changed and the number of folded structures is similarly counted three times, and an arithmetic mean value of the obtained values is defined as the number of folded structures.

[Components Included in Cholesteric Liquid Crystal Film]

Hereinafter, components included in the cholesteric liquid crystal film according to the embodiment of the present disclosure will be described.

The cholesteric liquid crystal film according to the embodiment of the present disclosure includes a liquid crystal compound forming the cholesteric liquid crystal.

In addition, the cholesteric liquid crystal film according to the embodiment of the present disclosure may include other components (for example, a chiral agent, a solvent, an alignment restriction agent, a polymerization initiator, a leveling agent, an alignment assistant, a sensitizer, and the like) as necessary.

(Liquid Crystal Compound)

The liquid crystal compound included in the cholesteric liquid crystal film according to the embodiment of the present disclosure is not particularly limited. As the liquid crystal compound, for example, a known liquid crystal compound which forms a cholesteric liquid crystal can be used.

The liquid crystal compound may have a polymerizable group. The liquid crystal compound may have one kind alone or two or more kinds of the polymerizable groups. In a case where the liquid crystal compound has a polymerizable group, the liquid crystal compound can be polymerized. By polymerizing the liquid crystal compound, stability of the cholesteric liquid crystal can be improved.

Examples of the polymerizable group include a group having an ethylenically unsaturated double bond, a cyclic ether group, and a nitrogen-containing heterocyclic group capable of causing a ring-opening reaction.

Examples of the group having an ethylenically unsaturated double bond include an acryloyl group, a methacryloyl group, an acryloyloxy group, a methacryloyloxy group, a vinyl group, a vinylphenyl group, and an allyl group.

Examples of the cyclic ether group include an epoxy group and an oxetanyl group.

Examples of the nitrogen-containing heterocyclic group capable of causing a ring-opening reaction include an aziridinyl group.

The polymerizable group is preferably at least one selected from the group consisting of a group having an ethylenically unsaturated double bond and a cyclic ether group. Specifically, the polymerizable group is preferably at least one selected from the group consisting of an acryloyl group, a methacryloyl group, an acryloyloxy group, a methacryloyloxy group, a vinyl group, a vinylphenyl group, an allyl group, an epoxy group, an oxetanyl group, and an aziridinyl group, more preferably at least one selected from the group consisting of an acryloyl group, a methacryloyl group, an acryloyloxy group, and a methacryloyloxy group, and particularly preferably at least one selected from the group consisting of an acryloyloxy group and a methacryloyloxy group.

The liquid crystal compound is classified into, for example, a rod-like liquid crystal compound and a disk-like liquid crystal compound according to a chemical structure. The rod-like liquid crystal compound is known as a liquid crystal compound having a rod-like chemical structure. As the rod-like liquid crystal compound, for example, a known rod-like liquid crystal compound can be used. The disk-like liquid crystal compound is known as a liquid crystal compound having a disk-like chemical structure. As the disk-like liquid crystal compound, for example, a known disk-like liquid crystal compound can be used.

From the viewpoint of adjusting optical characteristics (particularly, diffraction characteristics of light) of the cholesteric liquid crystal film, the liquid crystal compound is preferably a rod-like liquid crystal compound, and more preferably a rod-like thermotropic liquid crystal compound.

The rod-like thermotropic liquid crystal compound is a compound which has a rod-like chemical structure and exhibits liquid crystallinity in a specific temperature range. As the rod-like thermotropic liquid crystal compound, for example, a known rod-like thermotropic liquid crystal compound can be used.

Examples of the rod-like thermotropic liquid crystal compound include compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO1995/22586A, WO1995/24455A, WO1997/00600A, WO1998/23580A, WO1998/52905A, JP1989-272551A (JP-H1-272551A), JP1994-16616A (JP-H6-16616A), JP1995-110469A (JP-H7-110469A), JP1999-513019B (JP-H 11-513019B), JP1999-80081A (JP-H11-80081A), JP2001-328973A, and JP2007-279688A. Examples of the rod-like thermotropic liquid crystal compound also include the liquid crystal compound represented by General Formula 1 in JP2016-81035A and the compound represented by General Formula (I) or General Formula (II) in JP2007-279688A.

The rod-like thermotropic liquid crystal compound is preferably a compound represented by General Formula (1).

$$Q^1—L^1—A^1—L^3—M—L^4—A^2—L^2—Q^2 \quad (1)$$

In General Formula (1), $Q^1$ and $Q^2$ each independently represent a polymerizable group, $L^1$, $L^2$, $L^3$, and $L^4$ each independently represent a single bond or a divalent linking group, $A^1$ and $A^2$ each independently represent a divalent hydrocarbon group having 2 to 20 carbon atoms, and M represents a mesogen group.

Examples of the polymerizable group represented $Q^1$ and $Q^2$ in General Formula (1) include the above-described polymerizable group. Preferred aspects of the polymerizable group represented by $Q^1$ and $Q^2$ are the same as those of the polymerizable group described above.

As the divalent linking group represented by $L^1$, $L^2$, $L^3$, and $L^4$ in General Formula (1), a divalent linking group selected from the group consisting of —O—, —S—, —CO—, —NR—, —CO—O—, —O—CO—O—, —CO—NR—, —NR—CO—, —O—CO—, —O—CO—NR—, —NR—CO—O—, and NR—CO—NR— is preferable. R in the above-described divalent linking group represents an alkyl group having 1 to 7 carbon atoms or a hydrogen atom.

In General Formula (1), at least one of $L^3$ or $L^4$ is preferably —O—CO—O—.

In General Formula (1), $Q^1$-$L^1$- and $Q^2$-$L^2$- are each independently preferably $CH_2$═CH—CO—O—, $CH_2$═C($CH_3$)—CO—O—, or $CH_2$═C(Cl)—CO—O—, and more preferably $CH_2$═CH—CO—O—.

The divalent hydrocarbon group represented by $A^1$ and $A^2$ in General Formula (1) is preferably an alkylene group having 2 to 12 carbon atoms, an alkenylene group having 2 to 12 carbon atoms, or an alkynylene group having 2 to 12 carbon atoms, and more preferably an alkylene group having 2 to 12 carbon atoms. The divalent hydrocarbon group is preferably in a form of a chain. The divalent hydrocarbon group may include oxygen atoms which are not adjacent to each other or sulfur atoms which are not adjacent to each other. The divalent hydrocarbon group may have a substituent. Examples of the substituent include a halogen atom (for example, fluorine, chlorine, and bromine), a cyano group, a methyl group, and an ethyl group.

The mesogen group represented by M in General Formula (1) is a group which forms a main skeleton of the liquid crystal compound and contributes to the formation of the liquid crystal. With regard to the mesogen group represented by M, the description of "Flussige Kristalle in Tabellen II" (VEB Deutscher Verlag fur Grundstoff Industrie, Leipzig, 1984) (particularly, pp. 7 to 16) and the description of "Liquid Crystal Handbook"(edited by Liquid Crystals Handbook Editing Committee, Maruzen, 2000) (particularly, section 3) can be referred to.

Examples of a specific structure of the mesogen group represented by M in General Formula (1) include the structure described in paragraph [0086] of JP2007-279688A.

The mesogen group represented by M in General Formula (1) is preferably a group including at least one cyclic structure selected from the group consisting of an aromatic hydrocarbon group, a heterocyclic group, and an alicyclic hydrocarbon group, and more preferably a group including an aromatic hydrocarbon group.

The mesogen group represented by M in General Formula (1) is preferably a group including 2 to 5 aromatic hydrocarbon groups, and more preferably a group including 3 to 5 aromatic hydrocarbon groups.

The mesogen group represented by M in General Formula (1) is preferably a group which includes 3 to 5 phenylene groups and in which the phenylene groups are linked to each other by —CO—O—.

The cyclic structure (for example, an aromatic hydrocarbon group, a heterocyclic group, and an alicyclic hydrocarbon group) included in the mesogen group represented by M in General Formula (1) may have a substituent. Examples of the substituent include an alkyl group having 1 to 10 carbon atoms (for example, a methyl group).

Specific examples of the compound represented by General Formula (1) are as follows. However, the compound represented by General Formula (1) is not limited to the compounds shown below. In the chemical structure of the compounds shown below, "—Me" represents a methyl group.

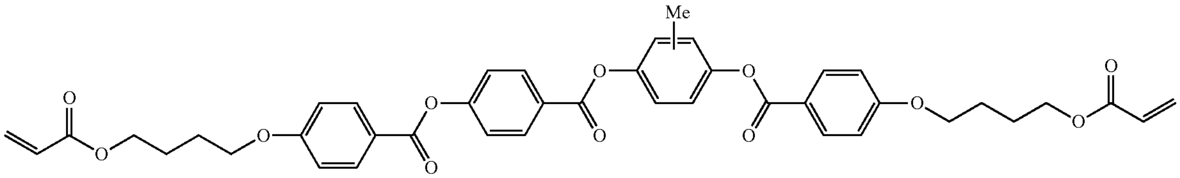

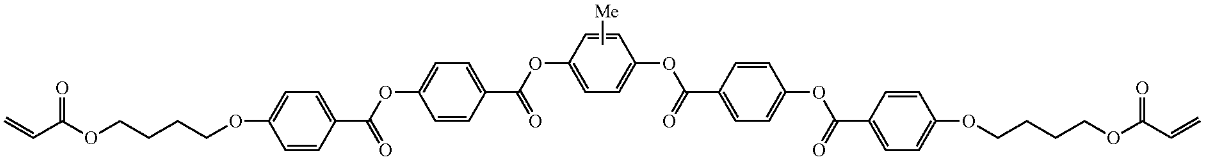

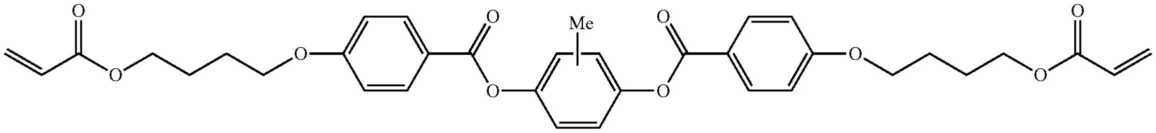

Specific examples of the rod-like thermotropic liquid crystal compound are shown below. However, the rod-like thermotropic liquid crystal compound is not limited to the compounds shown below.

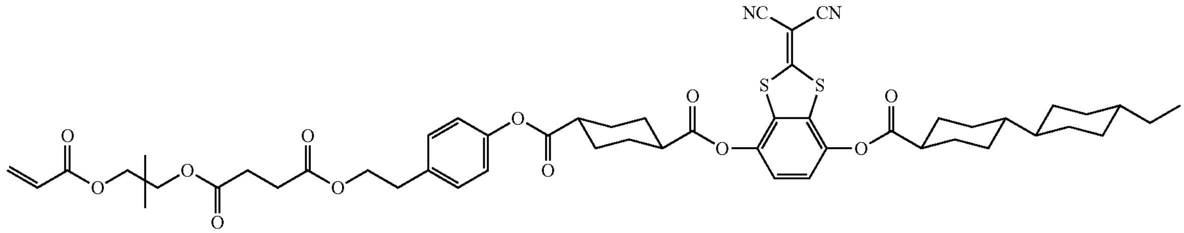

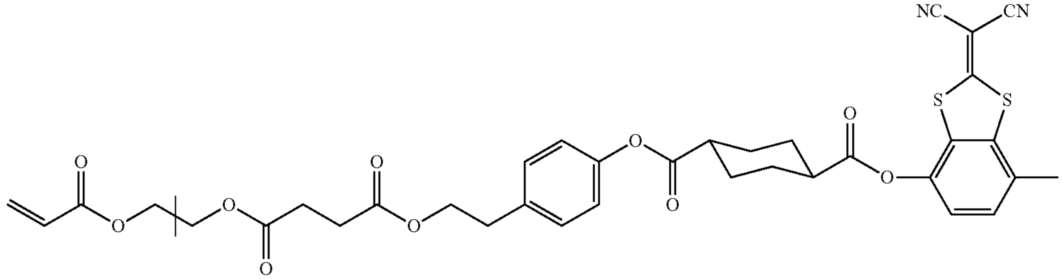

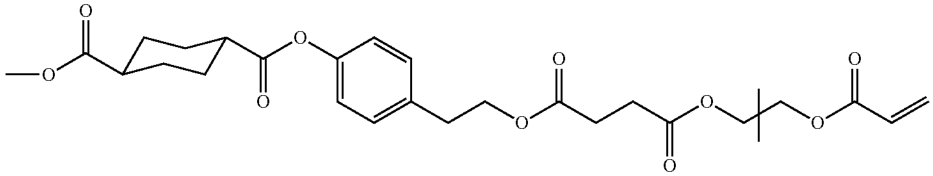

-continued

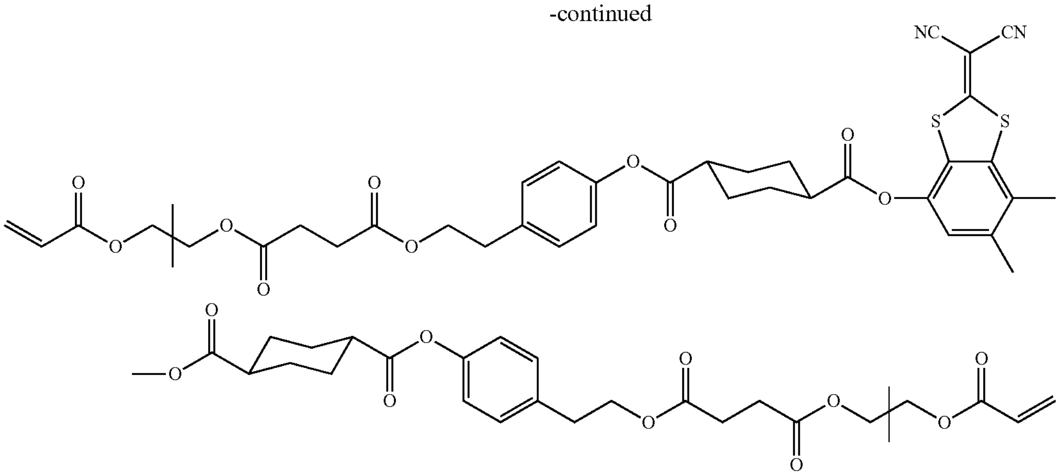

The liquid crystal compound may be a synthetic product synthesized by a known method or a commercially available product.

The commercially available product of the liquid crystal compound is available from, for example, Tokyo Chemical Industry Co., Ltd. and FUJIFILM Wako Pure Chemical Corporation.

From the viewpoint of heat resistance, a content of the liquid crystal compound is preferably 70% by mass or more, more preferably 80% by mass or more, and particularly preferably 90% by mass or more with respect to the total mass of the cholesteric liquid crystal film. The upper limit of the content of the liquid crystal compound is not limited. The content of the liquid crystal compound may be determined in a range of 100% by mass or less with respect to the total mass of the cholesteric liquid crystal film. In a case where the cholesteric liquid crystal film includes a component other than the liquid crystal compound, a content of the liquid crystal compound may be determined in a range of less than 100% by mass (preferably 98% by mass or less or 95% by mass or less) with respect to the total mass of the cholesteric liquid crystal film.

For example, the content of the liquid crystal compound is preferably 70% by mass or more and less than 100% by mass, more preferably 80% by mass to 98% by mass, and particularly preferably 90% by mass to 95% by mass with respect to the total mass of the cholesteric liquid crystal film.

(Other Components)

The cholesteric liquid crystal film may include a component other than the liquid crystal compound (hereinafter, referred to as "other components" in this paragraph). Examples of the other components include a chiral agent, a solvent, an alignment restriction agent, a polymerization initiator, a leveling agent, an alignment assistant, and a sensitizer.

[Film Thickness of Cholesteric Liquid Crystal Film]

A film thickness of the cholesteric liquid crystal film is not particularly limited, and may be determined according to the application.

From the viewpoint of film hardness, the film thickness of the cholesteric liquid crystal film is preferably 0.5 μm or more, more preferably 1 μm or more, and particularly preferably 2 μm or more.

From the viewpoint of alignment accuracy, the film thickness of the cholesteric liquid crystal film is preferably 30 μm or less, more preferably 25 μm or less, and particularly preferably 20 μm or less.

For example, the film thickness of the cholesteric liquid crystal film is preferably 0.5 μm to 30 μm, more preferably 1 μm to 25 μm, and particularly preferably 2 μm to 20 μm.

The film thickness of the cholesteric liquid crystal film is determined by the following method.

In the microscopic observation of the cross section in the thickness direction, film thicknesses at five points are measured.

An arithmetic mean value of the measured values is defined as the film thickness of the cholesteric liquid crystal film.

[Other Layers]

The cholesteric liquid crystal film according to the embodiment of the present disclosure may have a laminated structure together with a layer other than the cholesteric liquid crystal film, in addition to the cholesteric liquid crystal film.

The types of other layers are not limited within a range not departing from the scope of the present disclosure. Examples of the other layers include a substrate and an alignment layer.

(Substrate)

The cholesteric liquid crystal film according to the embodiment of the present disclosure may have a laminated structure together with a substrate.

The substrate is preferably a resin substrate.

Examples of the resin substrate include a polyester-based substrate (for example, polyethylene terephthalate and polyethylene naphthalate), a cellulose-based substrate (for example, diacetyl cellulose and triacetyl cellulose (abbreviation: TAC)), a polycarbonate-based substrate, a poly(meth)acrylic substrate (for example, poly(meth)acrylate (such as polymethylmethacrylate)), a polystyrene-based substrate (for example, polystyrene and an acrylonitrile-styrene copolymer), an olefin-based substrate (for example, polyethylene, polypropylene, polyolefin having a cyclic structure (for example, a norbornene structure), and an ethylene-propylene copolymer), a polyamide-based substrate (for example, polyvinyl chloride, nylon, and aromatic polyamide), a polyimide-based substrate, a polysulfone-based substrate, a polyether sulfone-based substrate, a polyetheretherketone-based substrate, a polyphenylene sulfide-based substrate, a vinyl alcohol-based substrate, a polyvinylidene chloride-based substrate, a polyvinyl butyral-based substrate, a polyoxymethylene-based substrate, and an epoxy resin-based substrate. The substrate may be a substrate including two or more kinds of resins (that is, a blend polymer). The substrate is preferably a cellulose-based substrate, and more preferably a substrate including triacetyl cellulose.

From the viewpoint of manufacturing suitability, manufacturing cost, and optical characteristics, a thickness of the substrate is preferably in a range of 30 μm to 150 μm, and more preferably 40 μm to 100 μm.

(Alignment Layer)

The cholesteric liquid crystal film according to the embodiment of the present disclosure may have a laminated structure in which an alignment layer is provided between the substrate and the cholesteric liquid crystal film.

As the alignment layer, for example, a known alignment layer having a function of applying the alignment restriction force to the liquid crystal compound can be used. The alignment layer may be an alignment layer in which the alignment function is generated by applying an electric field, applying a magnetic field, or irradiating light.

A film thickness of the alignment layer is preferably in a range of 0.1 μm to 10 μm, and more preferably in a range of 1 μm to 5 μm.

Examples of a method for forming the alignment layer include a rubbing treatment of an organic compound (preferably, a polymer), an orthorhombic deposition of an inorganic compound, and a formation of a layer having a microgroove.

[Application]

The cholesteric liquid crystal film according to the embodiment of the present disclosure is expected to be applied to a transparent screen, lighting, an electronic signage, or the like.

<Manufacturing Method of Cholesteric Liquid Crystal Film>

A manufacturing method of the cholesteric liquid crystal film according to the embodiment of the present disclosure is not limited as long as a method capable of manufacturing a cholesteric liquid crystal film having a stripe pattern in which dark portions and bright portions are alternately arranged and having a folded structure due to the dark portions on a surface layer portion of one main surface of a pair of main surfaces in a cross section in a thickness direction observed with a microscope, as described above.

Hereinafter, an example of the manufacturing method of the cholesteric liquid crystal film according to the embodiment of the present disclosure will be described, but the present invention is not limited to this manufacturing method.

The manufacturing method of the cholesteric liquid crystal film according to the embodiment of the present disclosure includes a first step of applying a coating liquid including a solvent, a liquid crystal compound, and a chiral agent onto a substrate to form a coating film and a second step of applying a shearing force to a surface of the formed coating film with a blade, in which a shear rate in the second step is 1000 seconds' or more.

Hereinafter, each step will be specifically described.

[First Step]

In the first step, a coating liquid including a solvent, a liquid crystal compound, and a chiral agent is applied onto a substrate to form a coating film.

(Substrate)

Examples of the substrate used in the first step include the substrate described in the above section of "Substrate". Preferred aspects of the substrate used in the first step are the same as the substrate described in the above section of "Substrate". An alignment layer may be disposed in advance on a surface of the substrate used in the first step.

(Liquid Crystal Compound)

As the liquid crystal compound included in the coating liquid used in the first step, for example, the liquid crystal compound described in the above section of "Liquid crystal compound" can be used. Preferred aspects of the liquid crystal compound included in the coating liquid are the same as the liquid crystal compound described in the above section of "Liquid crystal compound".

The coating liquid may include one kind alone or two or more kinds of the liquid crystal compounds.

A content of the liquid crystal compound is preferably 70% by mass or more, more preferably 80% by mass or more, and particularly preferably 90% by mass or more with respect to the mass of solid content of the coating liquid. The upper limit of the content of the liquid crystal compound may be determined according to the content of components other than the liquid crystal compound. The content of the liquid crystal compound may be determined in a range of less than 100% by mass (preferably 98% by mass or less or 95% by mass or less) with respect to the mass of the solid content of the coating liquid.

(Chiral Agent)

The type of the chiral agent is not limited.

As the chiral agent, for example, a known chiral agent (for example, chiral agents described in "Liquid Crystal Device Handbook, chapter 3, section 4-3, chiral agents for TN and STN, page 199, Japan Society for the Promotion of Science edited by the 142nd committee, 1989" can be used.

Many chiral agents include an asymmetric carbon atom. However, the chiral agent is not limited to compounds including an asymmetric carbon atom. Examples of the chiral agent include an axial asymmetric compound not including an asymmetric carbon atom and a planar asymmetric compound. Examples of the axial asymmetric compound or the planar asymmetric compound include binaphthyl, helicene, paracyclophane, and derivatives thereof.

The chiral agent may have a polymerizable group. For example, by a reaction of the chiral agent having a polymerizable group and the liquid crystal compound having a polymerizable group, a polymer having a structural unit derived from the chiral agent and a structural unit derived from the liquid crystal compound is obtained.

Examples of the polymerizable group in the chiral agent include the polymerizable group described in the above section of "Liquid crystal compound". Preferred aspects of the polymerizable group in the chiral agent are the same as those of the polymerizable group described in the above section of "Liquid crystal compound". The type of the polymerizable group in the chiral agent is preferably the same as the type of the polymerizable group in the liquid crystal compound.

Examples of a chiral agent exhibiting a strong twisting force include chiral agents described in JP2010-181852A, JP2003-287623A, JP2002-80851A, JP2002-80478A, and JP2002-302487A. For isosorbide compounds described in the above-mentioned documents, isomannide compounds having the corresponding structure can also be used as the chiral agent. In addition, for isomannide compounds described in the above-mentioned documents, isosorbide compounds having the corresponding structure can also be used as the chiral agent.

A content of the chiral agent is preferably 0.5% by mass to 10.0% by mass, more preferably 0.8% by mass to 3.0% by mass, and particularly preferably 1.0% by mass to 3.0% by mass with respect to the mass of solid content of the coating liquid.

(Solvent)

As the solvent, an organic solvent is preferable. Examples of the organic solvent include an amide solvent (for example, N,N-dimethylformamide), a sulfoxide solvent (for example, dimethyl sulfoxide), a heterocyclic compound (for example, pyridine), a hydrocarbon solvent (for example, benzene and hexane), an alkyl halide solvent (for example, chloroform and dichloromethane), an ester solvent (for example, methyl acetate and butyl acetate), a ketone solvent (for example, acetone, methyl ethyl ketone, and cyclohexanone), and an ether solvent (for example, tetrahydrofuran and 1,2-dimethoxyethane). The organic solvent is preferably at least one selected from the group consisting of an alkyl halide solvent and a ketone solvent, and more preferably a ketone solvent.

The coating liquid may include one kind alone or two or more kinds of the solvents.

A content of solid content in the coating liquid is preferably 25% by mass to 40% by mass and more preferably 25% by mass to 35% by mass with respect to the total mass of the coating liquid.

(Other Components)

The coating liquid used in the first step may include a component other than the above-described components. Examples of the other components include an alignment restriction agent, a polymerization initiator, a leveling agent, an alignment assistant, and a sensitizer.

Alignment Restriction Agent

Examples of the alignment restriction agent include compounds described paragraphs [0012] to [0030] of JP2012-211306A, compounds described in paragraphs [0037] to [0044] of JP2012-101999A, fluorine-containing (meth)acrylate polymers described in paragraphs [0018] to [0043] of JP2007-272185A, and compounds described in detail in JP2005-099258A together with a synthesis method. A polymer including a polymerization unit of a fluoroaliphatic group-containing monomer in an amount of more than 50% by mass of the total polymerization unit, which is described in JP2004-331812A, may be used as the alignment restriction agent.

Examples of the alignment restriction agent also include a vertical alignment agent. Examples of the vertical alignment agent include a boronic acid compound and/or onium salt described in JP2015-38598A and an onium salt described in JP2008-26730A.

A content of the alignment restriction agent is preferably more than 0% by mass and 5.0% by mass or less, and more preferably 0.3% by mass to 2.0% by mass with respect to the mass of solid content of the coating liquid.

Polymerization Initiator

Examples of the polymerization initiator include a photopolymerization initiator and a thermal polymerization initiator.

From the viewpoint of suppressing deformation of the substrate due to heat and deterioration of the coating liquid, the polymerization initiator is preferably a photopolymerization initiator. Examples of the photopolymerization initiator include α-carbonyl compounds (for example, compounds described in U.S. Pat. Nos. 2,367,661A and 2,367,670A), acyloin ethers (for example, compounds described in U.S. Pat. No. 2,448,828A), α-hydrocarbon-substituted aromatic acyloin compounds (for example, compounds described in U.S. Pat. No. 2,722,512A), polynuclear quinone compounds (for example, compounds described in U.S. Pat. Nos. 3,046,127A and 2,951,758A), combinations of a triarylimidazole dimer and a p-aminophenylketone (for example, compounds described in U.S. Pat. No. 3,549,367A), acridine compounds (for example, compounds described in JP1985-105667A (JP-S60-105667A) and U.S. Pat. No. 4,239,850A), phenazine compounds (for example, compounds described in JP1985-105667A (JP-S60-105567A) and U.S. Pat. No. 4,239,850A), oxadiazole compounds (for example, compounds described in U.S. Pat. No. 4,212,970A), and acylphosphine oxide compounds (for example, compounds described in JP1988-40799B (JP-S63-40799B), JP1993-29234B (JP-H5-29234B), JP1998-95788A (JP-H10-95788A), and JP1998-29997A (JP-H10-29997A)).

A content of the polymerization initiator is preferably 0.5% by mass to 5.0% by mass, and more preferably 1.0% by mass to 4.0% by mass with respect to the mass of solid content of the coating liquid.

(Preparation Method of Coating Liquid)

A preparation method of the coating liquid used in the first step is not limited.

Examples of the preparation method of the coating liquid include a method of mixing the above-described components. As the mixing method, a known mixing method can be used. In the preparation method of the coating liquid, a mixture obtained by mixing the above-described respective components may be filtered.

[Applying Method]

An applying method of the coating liquid is not limited.

Examples of the applying method of the coating liquid include an extrusion die coater method, a curtain coating method, a dip coating method, a spin coating method, a printing coating method, a spray coating method, a slot coating method, a roll coating method, a slide coating method, a blade coating method, a gravure coating method, and a wire bar coating method.

[Thickness of Coating Film]

A thickness of the coating film (that is, an applying amount of the coating liquid) is not limited.

The thickness of the coating film may be determined, for example, depending on the target thickness of the cholesteric liquid crystal film or the thickness of the coating film before applying the shearing force described in the section of “Second step” below.

[Second Step]

In the second step, a shearing force is applied to a surface of the coating film formed in the first step with a blade. A shear rate in the second step is 1000 seconds’ or more.

(Applying Shearing Force with Blade)

In the method of applying the shearing force to the surface of the coating film using a blade, it is preferable to scrape the surface of the coating film with the blade. In the above-described method, the thickness of the coating film may change before and after applying the shearing force. The thickness of the coating film after applying the shearing force with the blade may be ½ or less or ⅓ or less of the thickness of the coating film before applying the shearing force. The thickness of the coating film after applying the shearing force with the blade is preferably ¼ or more of the thickness of the coating film before applying the shearing force.

A material of the blade is not limited. Examples of the material of the blade include metals (for example, stainless steel) and resins (for example, TEFLON (registered trademark) and polyetheretherketone (PEEK)).

A shape of the blade is not limited. Examples of the shape of the blade include a plate shape.

From the viewpoint of easily applying the shearing force to the coating film, the blade is preferably a metal plate-shaped member.

From the viewpoint of easily applying the shearing force to the coating film, a thickness of a tip part of the blade in contact with the coating film is preferably 0.1 mm or more and more preferably 1 mm or more. The upper limit of the thickness of the blade is not limited. The thickness of the blade may be determined, for example, in a range of 10 mm or less.

(Shear Rate)

The shear rate in the second step is 1000 seconds$^{-1}$ or more, more preferably 10000 seconds$^{-1}$ or more and particularly preferably 30000 seconds$^{-1}$ or more. The upper limit of the shear rate is not limited. The shear rate may be determined, for example, in a range of $1.0\times10^6$ seconds$^{-1}$ or less.

Hereinafter, how to obtain the shear rate will be described. For example, in a case where the shearing force is applied using a blade, the shear rate is determined by "V/d" in a case where the shortest distance between the blade and the substrate is defined as "d" and a transportation speed of the coating film in contact with the blade (that is, a relative speed between the coating film and the blade) is defined as "V".

(Surface Temperature of Coating Film)

A surface temperature of the coating film in a case of applying the shearing force may be determined according to a phase transition temperature of the liquid crystal compound included in the coating film. The surface temperature of the coating film to which the shearing force is applied is preferably 50° C. to 120° C. and more preferably 60° C. to 100° C. By adjusting the surface temperature of the coating film within the above-described range, a cholesteric liquid crystal film having high alignment accuracy can be obtained. The surface temperature of the coating film is measured using a radiation thermometer in which emissivity is calibrated by a temperature value measured by a noncontact thermometer. The surface temperature of the coating film is measured within 10 cm from the surface on the side (that is, a back side) opposite to the measurement surface without any reflector.

(Thickness of Coating Film)

From the viewpoint of forming a cholesteric liquid crystal film having high alignment accuracy, a thickness of the coating film before applying the shearing force is preferably 30 μm or less and more preferably in a range of 10 μm to 25 μm.

From the viewpoint of forming a cholesteric liquid crystal film having high alignment accuracy, the thickness of the coating film after applying the shearing force is preferably 10 μm or less and more preferably 8 μm or less. The lower limit of the thickness of the coating film after applying the shearing force is not limited. The thickness of the coating film after applying the shearing force is preferably in a range of 5 μm or more.

[Third Step]

The manufacturing method of the cholesteric liquid crystal film according to the embodiment of the present disclosure preferably includes, between the first step and the second step, a third step of adjusting the content of the solvent in the applied coating film to a range of 50% by mass or less with respect to the total mass of the coating film.

By adjusting the content of the solvent in the coating film to the range of 50% by mass or less, a cholesteric liquid crystal film having high alignment accuracy can be formed.

In the third step, the content of the solvent in the coating film is preferably 40% by mass or less and more preferably 30% by mass or less with respect to the total mass of the coating film. The lower limit of the content of the solvent in the coating film is not limited. The content of the solvent in the coating film may be 0% by mass or more than 0% by mass with respect to the total mass of the above-described coating film. From the viewpoint that it is easy to suppress deterioration of a surface condition of the applied coating film, the content of the solvent in the applied coating film is preferably 10% by mass or more.

The content of the solvent in the coating film is measured by an absolute dry method. Hereinafter, a specific procedure of the measuring method will be described. After drying a sample collected from the coating film at 60° C. for 24 hours, a mass change of the sample before and after drying (that is, a difference between the mass of the sample after drying and the mass of the sample before drying) is determined. An arithmetic mean of the values obtained by performing the above-described operation three times is defined as the content of the solvent.

In the third step, examples of a method for adjusting the content of the solvent in the coating film include drying.

As a unit for drying the coating film, a known drying unit can be used. Examples of the drying unit include an oven, a hot air blower, and an infrared (IR) heater.

In the drying using a hot air blower, a hot air may be blown directly onto the coating film, or a hot air may be blown onto the surface opposite to the surface on which the coating film of the substrate is disposed. In addition, a diffusion plate may be installed in order to prevent the surface of the coating film from flowing due to the hot air.

The drying may be performed by inhalation. For the drying by inhalation, for example, a decompression chamber having a discharge mechanism can be used. By inhaling gas around the coating film, the content of the solvent in the coating film can be reduced.

The drying conditions are not limited as long as the content of the solvent in the coating film can be adjusted to the range of 50% by mass or less. The drying conditions may be determined, for example, according to the components included in the coating film, the applying amount of the coating film, and the transportation speed.

[Fourth Step]

In a case where the coating liquid includes a polymerizable compound (for example, a liquid crystal compound having a polymerizable group or a chiral agent having a polymerizable group), the manufacturing method of the cholesteric liquid crystal film according to the embodiment of the present disclosure preferably includes, after the second step, a fourth step of curing the coating film to which the shearing force is applied.

By curing the coating film in the fourth step, the molecular arrangement of the liquid crystal compound can be fixed.

Examples of a method for curing the coating film include heating and irradiation with active energy ray. In the fourth step, from the viewpoint of manufacturing suitability, it is preferable to cure the coating film by irradiating the coating film to which the shearing force is applied with active energy ray.

Examples of the active energy ray include a rays, y rays, X-rays, ultraviolet rays, infrared rays, visible light rays, and electron beam. From the viewpoint of curing sensitivity and availability of equipment, the active energy ray is preferably ultraviolet rays.

Examples of a light source of ultraviolet rays include lamps (for example, a tungsten lamp, a halogen lamp, a xenon lamp, a xenon flash lamp, a mercury lamp, a mercury-xenon lamp, and a carbon arc lamp), lasers (for example, semiconductor laser, helium neon laser, argon ion laser, helium cadmium laser, and Yttrium Aluminum Garnet (YAG) laser), light emitting diodes, and cathode ray tube.

A peak wavelength of the ultraviolet rays emitted from the light source of ultraviolet rays is preferably 200 nm to 400 nm.

An exposure amount (also referred to as an integrated light amount) of ultraviolet rays is preferably 100 mJ/$cm^2$ to 500 mJ/$cm^2$.

[Other Steps]

The manufacturing method of the cholesteric liquid crystal film according to the embodiment of the present disclosure may include a step other than the above-described steps.

For example, the manufacturing method of the cholesteric liquid crystal film according to the embodiment of the present disclosure may include a step of forming an alignment layer on the substrate. The step of forming the alignment layer on the substrate is preferably performed before the first step.

The manufacturing method of the cholesteric liquid crystal film according to the embodiment of the present disclosure may be performed by a roll-to-roll system. In the roll-to-roll system, for example, each step is carried out while continuously transporting a long substrate.

The manufacturing method of the cholesteric liquid crystal film according to the embodiment of the present disclosure may be performed using a single-wafered substrate which is conveyed one by one.

Figure 3:
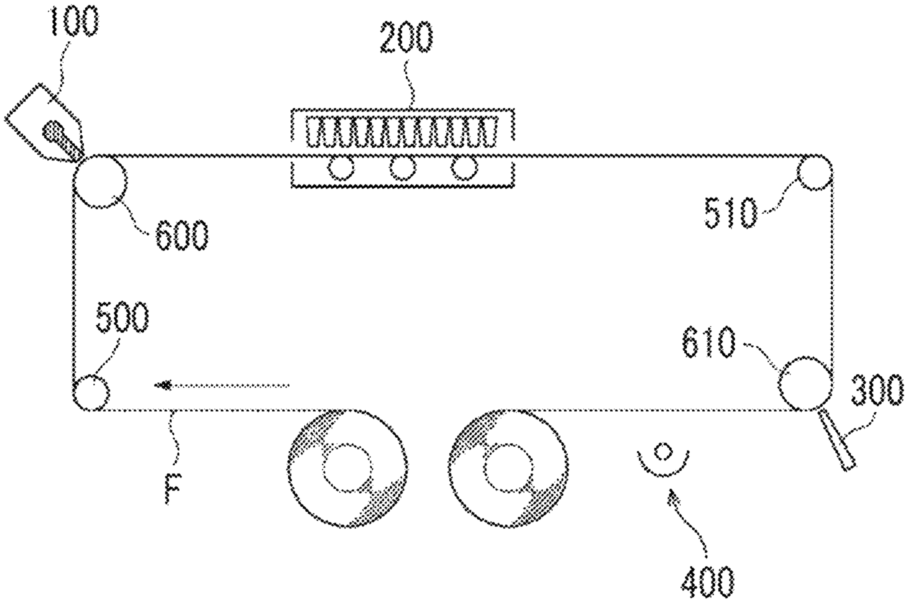
FIG. 3 is a schematic diagram showing an example of a manufacturing method of the cholesteric liquid crystal film according to the embodiment of the present disclosure.

The manufacturing method of the cholesteric liquid crystal film according to the embodiment of the present disclosure will be described with reference to FIG. 3. FIG. 3 is a schematic diagram showing an example of the manufacturing method of the cholesteric liquid crystal film according to the embodiment of the present disclosure.

In FIG. 3, the cholesteric liquid crystal film is manufactured by a roll-to-roll system. A long substrate F wound in a roll shape is conveyed in a direction of the arrow by a transport roll 500. A transportation speed of the substrate F is preferably 10 m/min to 100 m/min.

A coating liquid is applied onto the substrate F which has passed through the transport roll 500 by an application device 100 (first step).

The coating liquid includes a liquid crystal compound, a chiral agent, and a solvent.

The coating liquid is applied by the application device 100 in a region where the substrate F is wound on a backup roll 600. Hereinafter, preferred aspects of the backup roll 600 will be described.

A surface of the backup roll 600 may be, for example, hard chrome plated. A thickness of the plating is preferably 40 μm to 60 μm.

A surface roughness Ra of the backup roll 600 is preferably 0.1 μm or less.

A surface temperature of the backup roll 600 may be controlled in an arbitrary temperature range by a temperature controller. The surface temperature of the backup roll 600 may be determined according to the composition of the coating liquid, the curing performance of the coating liquid, and the heat resistance of the substrate. The surface temperature of the backup roll 600 is, for example, preferably 40° C. to 120° C. and more preferably 40° C. to 100° C. Examples of the temperature controller of the backup roll 600 include a heating unit and a cooling unit. Examples of the heating unit include induction heating, water heating, and oil heating. Examples of the cooling unit include cooling with cooling water.

A diameter of the backup roll 600 is preferably 100 mm to 1,000 mm, more preferably 100 mm to 800 mm, and particularly preferably 200 mm to 700 mm.

A wrap angle of the substrate F with respect to the backup roll 600 is preferably 60° or more, and more preferably 90° or more. In addition, the upper limit of the wrap angle can be set to, for example, 180°. The "wrap angle" means an angle formed by a transport direction of the substrate in a case where the substrate comes into contact with the backup roll and a transport direction of the substrate in a case where the substrate is separated from the backup roll.

The coating liquid is applied onto the substrate F by the application device 100 to form a coating film, and then the coating film is dried by a drying device 200 (third step).

By drying the coating film, the content of the solvent in the coating film is adjusted.

After the coating film is dried by the drying device 200, the upper surface of the coating film which passes through a transport roll 510 is scraped off by using a blade 300 to apply a shearing force to the surface of the coating film (second step).

The shearing force is applied along the transport direction of the coating film (that is, the transport direction of the substrate). The application of the shearing force with the blade 300 is performed in a region where the substrate F is wound on a backup roll 610.

Preferred aspects of the backup roll 610 are the same as that of the backup roll 600. The surface temperature of the backup roll 610 is, for example, preferably 50° C. to 120° C. and more preferably 60° C. to 100° C.

After applying the shearing force to the coating film, the coating film is cured by irradiating the coating film with active energy ray from a light source 400 (fourth step).

By curing the coating film, a cholesteric liquid crystal film is formed on the substrate.

EXAMPLES

Hereinafter, the present disclosure will be described in detail according to Examples. However, the present disclosure is not limited to the following Examples.

Example 1

[Preparation of Substrate]

As the substrate, a long triacetyl cellulose (TAC) film (Fujifilm Corporation, refractive index: 1.48, thickness: 80 μm, width: 300 mm) was prepared.

[Formation of Alignment Layer]

A coating liquid for forming an alignment layer was prepared by stirring a mixture including pure water (96 parts by mass) and PVA-205 (4 parts by mass, Kuraray Co., Ltd., polyvinyl alcohol) in a container kept warm at 80° C. Using a bar (count: 6), the above-described coating liquid for forming an alignment layer was applied onto the substrate (triacetyl cellulose film), and then dried in an oven at 100° C. for 10 minutes. By the above-described procedure, an alignment layer having a film thickness of 2 μm was formed on the substrate.

[Formation of Cholesteric Liquid Crystal Film]

By the following procedure, an 8 μm cholesteric liquid crystal film was formed on the alignment layer.

(Preparation of coating liquid (1) for forming liquid crystal layer)

After mixing each component shown below, a coating liquid (1) for forming a liquid crystal layer was prepared by filtering using a polypropylene filter (pore diameter: 0.2 μm).

Components (1) Rod-like thermotropic liquid crystal compound (compound (A) shown below): 100 parts by mass (2) Chiral agent (compound (B) shown below, Palicolor (registered trademark) LC756, BASF): 1.2 parts by mass (3) Photopolymerization initiator 1 (2-methyl-1-(4-methylthiophenyl)-2-morpholinopropan-1-one, Omnirad 907, IGM Resins B. V.): 3 parts by mass (4) Photopolymerization initiator 2 (PM758, Nippon Kayaku Co., Ltd.): 1 part by mass (5) Alignment restriction agent (compound (C) shown below): 0.5 parts by mass (6) Solvent (methyl ethyl ketone): 184 parts by mass (7) Solvent (cyclohexanone): 31 parts by mass The compound (A) is a mixture of the following three compounds. The content of each compound in the mixture is 84% by mass, 14% by mass, and 2% by mass in order from the top.

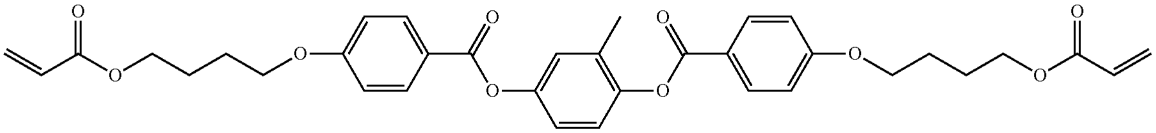

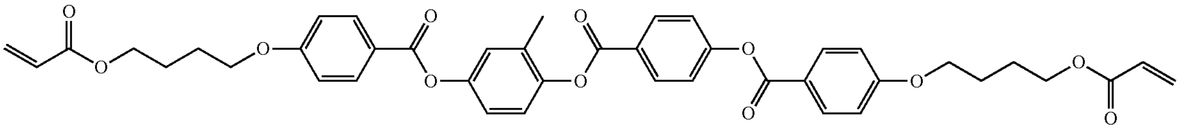

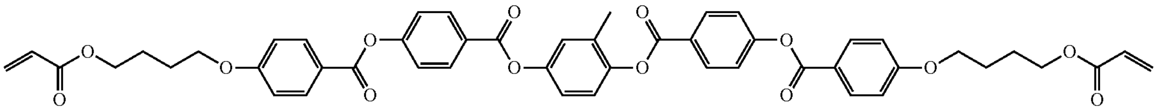

A chemical structure of the compound (B) is shown below.

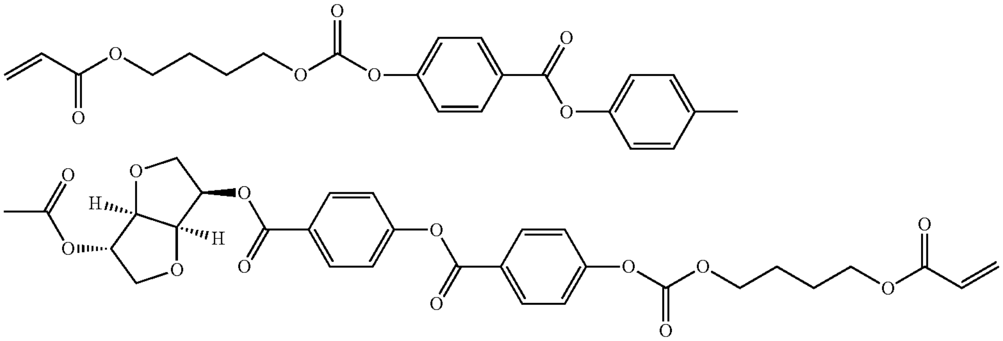

A chemical structure of the compound (C) is shown below.

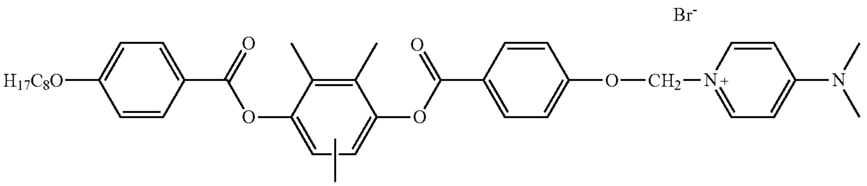

(Coating)

The substrate having the alignment layer was heated at 70° C., and then the coating liquid (1) for forming a liquid crystal layer was applied onto the alignment layer using a bar (count: 18).

(Drying)

The coating liquid (1) for forming a liquid crystal layer, which had been applied onto the alignment layer, was dried in an oven at 70° C. for 1 minute to form a coating film having a film thickness of 10 μm.

(Application of Shearing Force)

With the coating film heated to 70° C., a stainless steel blade heated to 70° C. was brought into contact with the coating film, and then a shearing force of a shear rate of 2500 seconds' was applied to the coating film by moving the blade at a speed of 1.5 m/min while keeping the stainless steel blade in contact with the coating film. A moving distance of the blade was 30 mm.

A film thickness of the coating film after applying the shearing force was 8 μm.

(Curing)

The coating film to which the shearing force was applied was irradiated with ultraviolet rays (exposure amount: 500 $mJ/cm^2$) using a metal halide lamp to cure the coating film.

Figure 4:
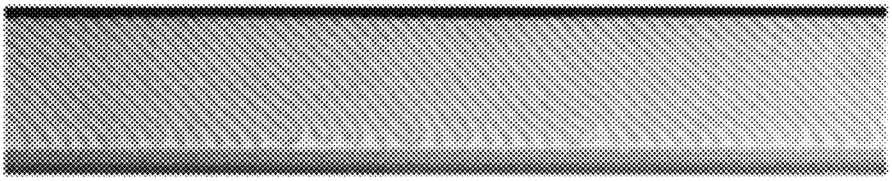
FIG. 4 is a microscopic observation image of a cholesteric liquid crystal film of Example 1 in a cross section in a thickness direction.

FIG. 4 shows a microscopic observation image of the cholesteric liquid crystal film of Example 1 obtained as described above in the cross section in the thickness direction.

Example 2

A cholesteric liquid crystal film of Example 2 was manufactured by the same procedure as in Example 1, except that a coating liquid (2) for forming a liquid crystal layer, in which the rod-like thermotropic liquid crystal compound was changed to the following compound (D) was used.

A chemical structure of the compound (D) is shown below.

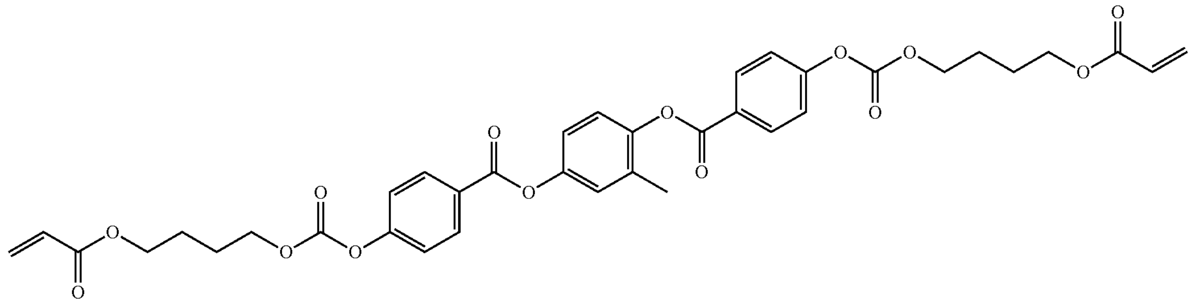 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Example 3

A coating liquid (3) for forming a liquid crystal layer was prepared in the same manner as in Example 1, except that the following components were used.

-Components- (1) Rod-like thermotropic liquid crystal compound (compound (A) shown above): 100 parts by mass (2) Chiral agent (compound (E) shown below): 1.2 parts by mass (3) Photopolymerization initiator 2 (PM758, Nippon Kayaku Co., Ltd.): 3 parts by mass (4) Photopolymerization initiator 3 (IRGANOX (registered trademark) 1010, BASF): 1 part by mass (5) Alignment restriction agent (compound (C) shown above): 0.5 parts by mass (6) Solvent (methyl ethyl ketone): 184 parts by mass (7) Solvent (cyclohexanone): 31 parts by mass A chemical structure of the compound (E) is shown below.

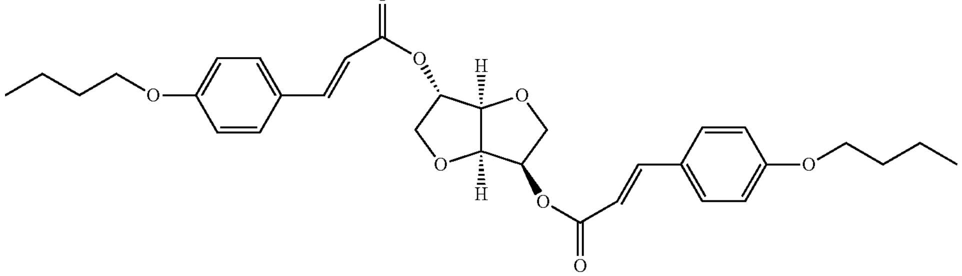

Subsequently, a cholesteric liquid crystal film of Example 3 was manufactured by the same procedure as in Example 1, except that the obtained coating liquid (3) for forming a liquid crystal layer was used and the following curing was performed.

(Curing)

The coating film to which the shearing force was applied was cured by irradiating the coating film with ultraviolet rays (exposure amount: 5 mJ·$cm^2$) of a high-pressure mercury lamp (HOYA Corporation, UL750) through a long-wavelength cut filter (Asahi Spectra Co., Ltd., SH0325).

Comparative Example 1

A cholesteric liquid crystal film of Comparative Example 1 was manufactured by the same procedure as in Example 1, except that the thickness of the coating film obtained through drying (that is, the thickness of the coating film before applying the shearing force) was changed to 25 μm, and then the following shearing force was applied.

Figure 5:
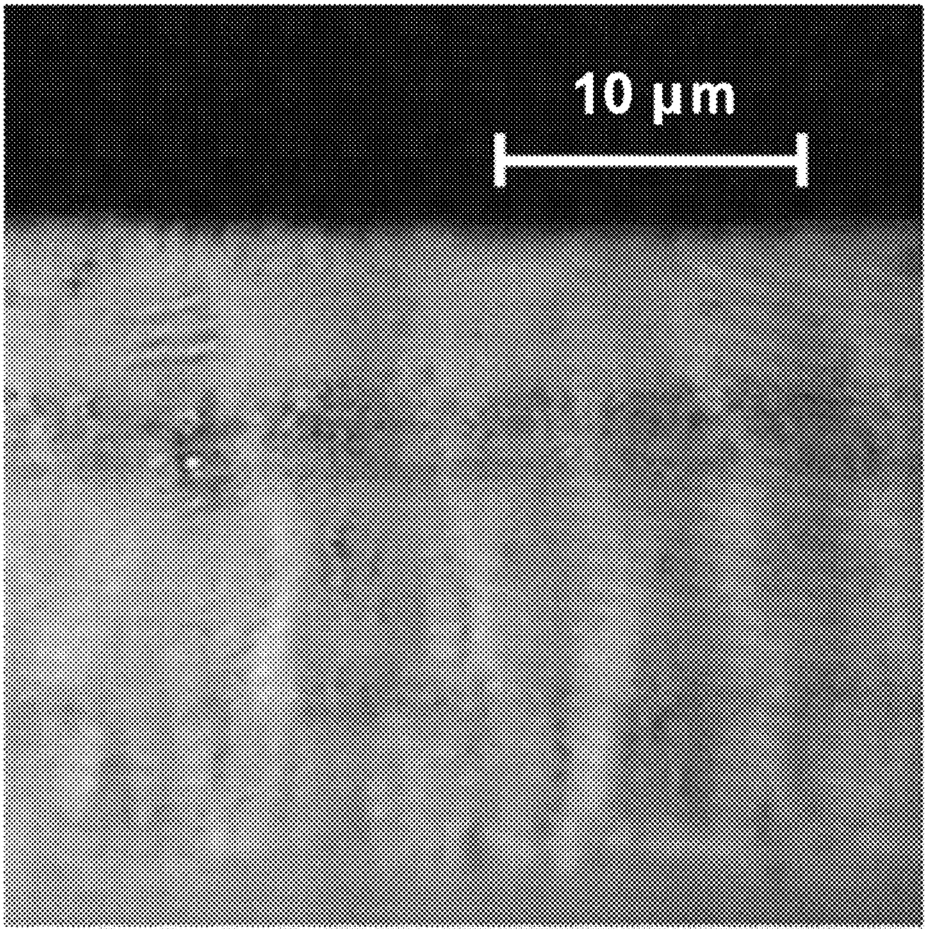
FIG. 5 is a microscopic observation image of a cholesteric liquid crystal film of Comparative Example 1 in a cross section in a thickness direction.

FIG. 5 shows a microscopic observation image of the cholesteric liquid crystal film of Comparative Example 1 in the cross section in the thickness direction.

(Application of Shearing Force)

With the coating film heated to 110° C., a stainless steel blade heated to 110° C. was brought into contact with the coating film, and then a shearing force of a shear rate of 600 $seconds^{-1}$ was applied to the coating film by moving the blade at a speed of 0.9 m/min while keeping the stainless steel blade in contact with the coating film. A moving distance of the blade was 30 mm.

A film thickness of the coating film after applying the shearing force was 22 μm.

[Microscopic Observation of Cross Section in Thickness Direction]

The obtained cholesteric liquid crystal film was cut with a microtome, a cross-sectional image in the thickness direction was captured using a polarization microscope NV100LPOL manufactured by Nikon Corporation, and a stripe pattern and a folded structure were observed from the photographic image.

In addition, the inclined angle of the dark portions in the stripe pattern, the distance between dark portions, and equal distantness (whether or not the dark portions are arranged at equal intervals) were determined.

The results are shown in Table 1.

TABLE 1

| | Strip pattern | | | | Folded structure | | |
|---|---|---|---|---|---|---|---|
| | | Dark portion | | | | | |
| | Presence or absence | Inclined angle [°] | Distance between dark portions [μm] | Equal distantness | Presence or absence in surface portion on main surface Fb side | Number [point] | Presence or absence in surface portion on main surface Fa side |
| Example 1 | Presence | 42 | 0.8 | Yes | Presence | 5 | Absence |
| Example 2 | Presence | 32 | 0.8 | Yes | Presence | 7 | Absence |
| Example 3 | Presence | 88 | 1.2 | Yes | Presence | 6 | Absence |
| Comparative Example 1 | Presence | 9 | 0.8 | Yes | Absence | — | Absence |

As is clear from Table 1, in the cholesteric liquid crystal films of Examples, by observing the cross section in the thickness direction with a microscope, the stripe pattern in which the dark portions and the bright portions are alternately arranged and the folded structure due to the dark portions at the surface layer portion of one main surface of the pair of main surfaces are seen.

EXPLANATION OF REFERENCES

- 1: cholesteric liquid crystal film
- 2: alignment layer
- 3: substrate
- 10: dark portion
- 12: folded structure by dark portions
- 20: bright portion
- 30: rod-like liquid crystal compound
- 30A: molecular axis
- Fa: main surface (example of other main surface in pair of main surfaces)
- Fb: main surface (example of one main surface in pair of main surfaces)
- HA: helical axis
- 100: application device
- 200: drying device
- 300: blade
- 400: light source
- 500, 510: transport roll
- 600, 610: backup roll
- F: substrate The disclosure of JP2020-015748 filed on Jan. 31, 2020 is incorporated in the present specification by reference. All documents, patent applications, and technical standards described in the present specification are herein incorporated by reference to the same extent that each individual document, patent application, or technical standard was specifically and individually indicated to be incorporated by reference.

What is claimed is:

1. A cholesteric liquid crystal film comprising:

a cholesteric liquid crystal, wherein, in a cross section in a thickness direction observed with a microscope, the cholesteric liquid crystal film has a stripe pattern in which dark portions and bright portions are alternately arranged, and has a folded structure formed by the dark portions at a surface layer portion of one main surface of a pair of main surfaces which corresponds to a front surface and a back surface of the cholesteric liquid crystal film, and wherein the folded structure formed by the dark portions includes a structure in which two dark portions adjacent to each other are bonded to each other to look like a U shape.

2. The cholesteric liquid crystal film according to claim 1, wherein, in the cross section, the dark portions in the stripe pattern is inclined with respect to the main surface.

3. The cholesteric liquid crystal film according to claim 2, wherein an inclined angle of the dark portions in the stripe pattern with respect to the main surface is 20° to 90° .

4. The cholesteric liquid crystal film according to claim 1, wherein the folded structure due to the dark portions exists in a region from the one main surface to 1/3 of a film thickness.

5. The cholesteric liquid crystal film according to claim 1, wherein, in the surface layer portion of the one main surface, the folded structure due to the dark portions exists at 2 to 10 places in 20 dark portions adjacent to each other.

6. The cholesteric liquid crystal film according to claim 1, wherein, in a surface layer portion of the other main surface of the pair of main surfaces, the folded structure due to the dark portions does not exist in 20 dark portions adjacent to each other, or exists in less than 2 places in 20 dark portions adjacent to each other.

* * * * *